US009165397B2

(12) United States Patent
Dillard et al.

(10) Patent No.: US 9,165,397 B2
(45) Date of Patent: Oct. 20, 2015

(54) TEXTURE BLENDING BETWEEN VIEW-DEPENDENT TEXTURE AND BASE TEXTURE IN A GEOGRAPHIC INFORMATION SYSTEM

(71) Applicant: Google Inc., Mountain View, CA (US)

(72) Inventors: Scott E. Dillard, Shoreline, WA (US); Brett A. Allen, San Francisco, CA (US); Aleksey Golovinskiy, San Francisco, SC (US)

(73) Assignee: Google Inc., Mountain View, CA (US)

( * ) Notice: Subject to any disclaimer, the term of this patent is extended or adjusted under 35 U.S.C. 154(b) by 317 days.

(21) Appl. No.: 13/921,631

(22) Filed: Jun. 19, 2013

(65) Prior Publication Data

US 2014/0375633 A1    Dec. 25, 2014

(51) Int. Cl.
G06T 17/05 (2011.01)
G06T 15/04 (2011.01)
G06T 15/20 (2011.01)

(52) U.S. Cl.
CPC ............. G06T 15/04 (2013.01); G06T 15/20 (2013.01); G06T 17/05 (2013.01)

(58) Field of Classification Search
None
See application file for complete search history.

(56) References Cited

U.S. PATENT DOCUMENTS

| 6,525,731 | B1 | 2/2003 | Suits et al. | |
| 7,348,989 | B2 | 3/2008 | Stevens et al. | |
| 7,369,136 | B1 * | 5/2008 | Heckbert et al. | 345/582 |
| 7,558,400 | B1 * | 7/2009 | Toksvig et al. | 382/100 |
| 8,279,218 | B1 | 10/2012 | Fan et al. | |
| 2003/0044088 | A1 * | 3/2003 | Wright | 382/300 |
| 2004/0012603 | A1 * | 1/2004 | Pfister et al. | 345/582 |
| 2004/0150638 | A1 * | 8/2004 | Ikeuchi et al. | 345/419 |
| 2005/0219256 | A1 * | 10/2005 | Donovan et al. | 345/586 |
| 2006/0017722 | A1 * | 1/2006 | Hong et al. | 345/419 |
| 2007/0247473 | A1 * | 10/2007 | Li | 345/587 |
| 2009/0128549 | A1 * | 5/2009 | Gloudemans et al. | 345/419 |
| 2012/0120069 | A1 * | 5/2012 | Kodaira et al. | 345/419 |
| 2013/0009950 | A1 * | 1/2013 | Ben-David et al. | 345/419 |
| 2013/0322702 | A1 * | 12/2013 | Piemonte et al. | 382/113 |

OTHER PUBLICATIONS

Pasewaldt, Multiscale 3D Geovirtual Env. Using View-Dependent Multi-Perspective Views, 2011, Journal of WSCG 2011, vol. 19, No. 3, p. 111-118.*

Pollefeys et al., Detailed Real-Time Urban 3D Reconstruction from Video, 2008, Int J Comput Vis (2008) 78: 143-167.*

(Continued)

Primary Examiner — Mark Zimmerman
Assistant Examiner — Phuc Doan
(74) Attorney, Agent, or Firm — Dority & Manning, P.A.

(57) ABSTRACT

Systems and methods for rendering a view-dependent texture in conjunction with a three-dimensional model of a geographic area are provided. A view-dependent texture can be rendered in conjunction with at least portions of the three-dimensional model. A base texture can be rendered for portions of the three-dimensional model in the same field of view that are viewed from a slightly different perspective than a reference direction associated with the view-dependent texture. For instance, a stretching factor can be determined for each portion of the three-dimensional model based on the reference direction and a viewpoint direction associated with the portion of the three-dimensional model. A base texture, a view-dependent texture, or a blended texture can be selected for rendering at the portion of the three-dimensional model based on the stretching factor.

19 Claims, 8 Drawing Sheets

(56) References Cited

OTHER PUBLICATIONS

Semmo et al., Interactive Visualization of Generalized Virtual 3D City Models using Level-of-Abstraction Transitions, Computer Graphics Forum, Eurographics Conference on Visualization (EuroVis) 2012, Blackwell Publishing.*

Purnomo, Seamless Texture Atlases, 2004, Eurographics Symposium on Geometry Processing, p. 65-74.*

Debevec et al., "Modeling and Rendering Architecture from Photographs: A Hybrid Geometry- and Image-Based Approach", Proceedings of the $23^{rd}$ Annual Conference on Computer Graphics and Interactive Techniques, Aug. 4-9, 1996, New Orleans, Louisiana, pp. 11-20.

Grimm et al., "Technical Report WUCS-2002-9: Creating View-Dependent Texture Maps", Washington University in St. Louis, Department of Computing Science, Nov. 22, 2000, 9 pages.

Porquet et al., "Real-Time High-Quality View-Dependent Texture Mapping Using Per-Pixel Visibility", Proceedings of the $3^{rd}$ International Conference on Computer Graphics and Interactive Techniques in Australia and Southeast Asia, Nov. 29-Dec. 2, 2005, Dunedin, New Zealand, pp. 213-220.

* cited by examiner

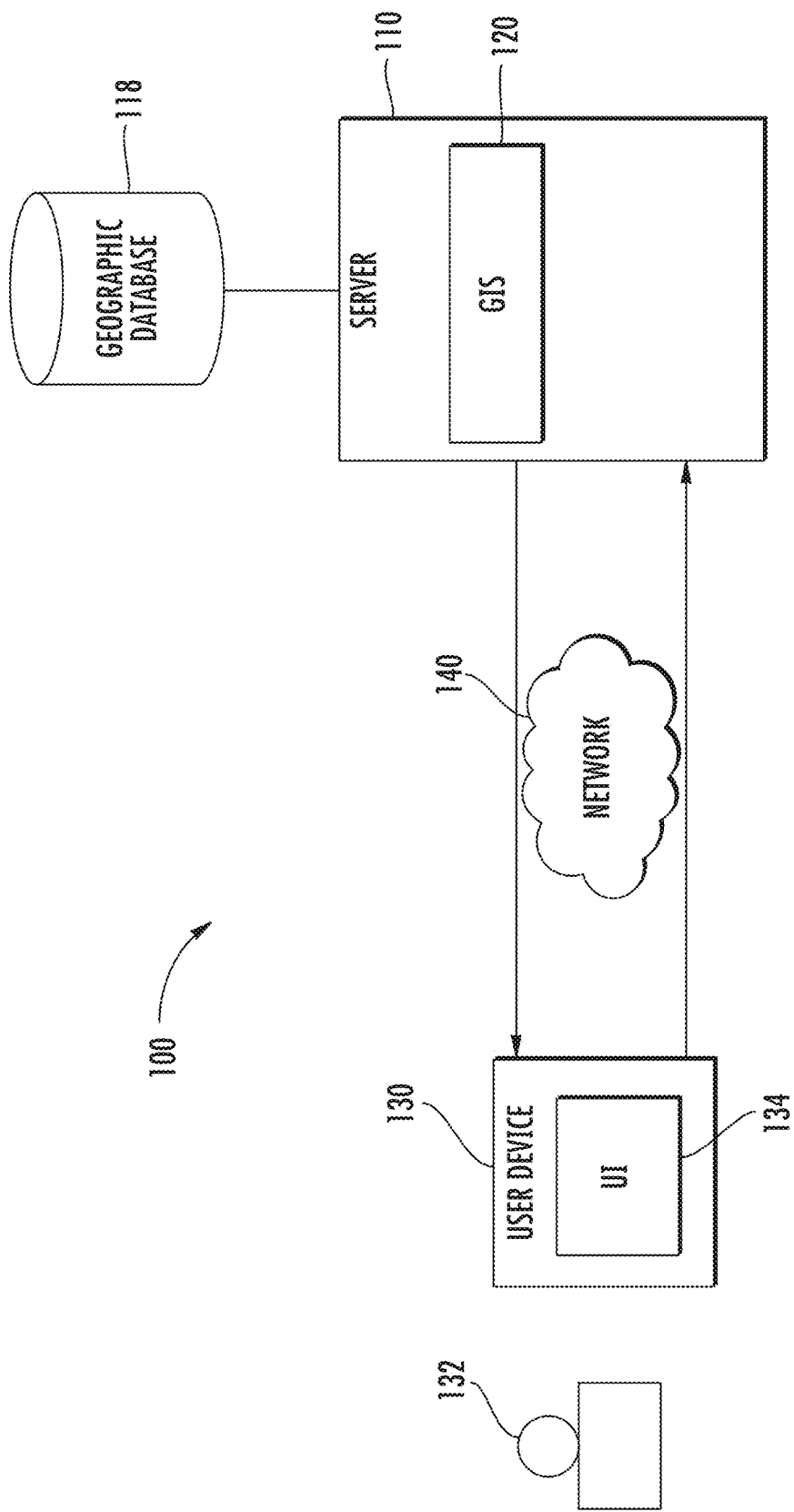

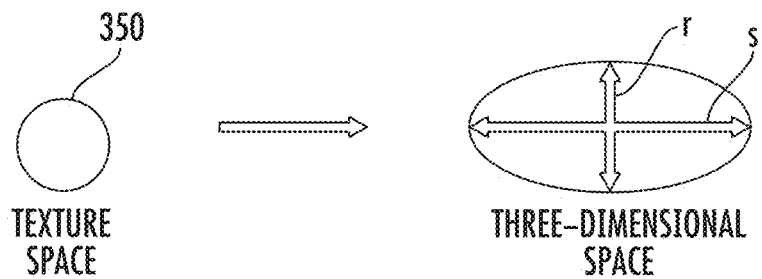
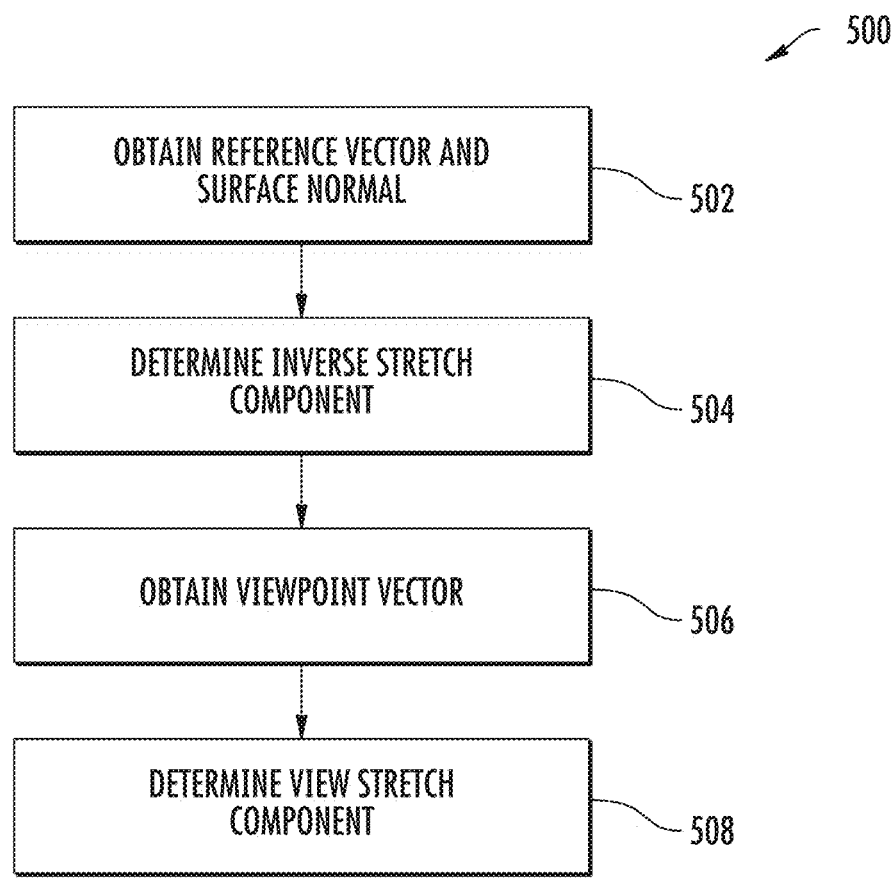

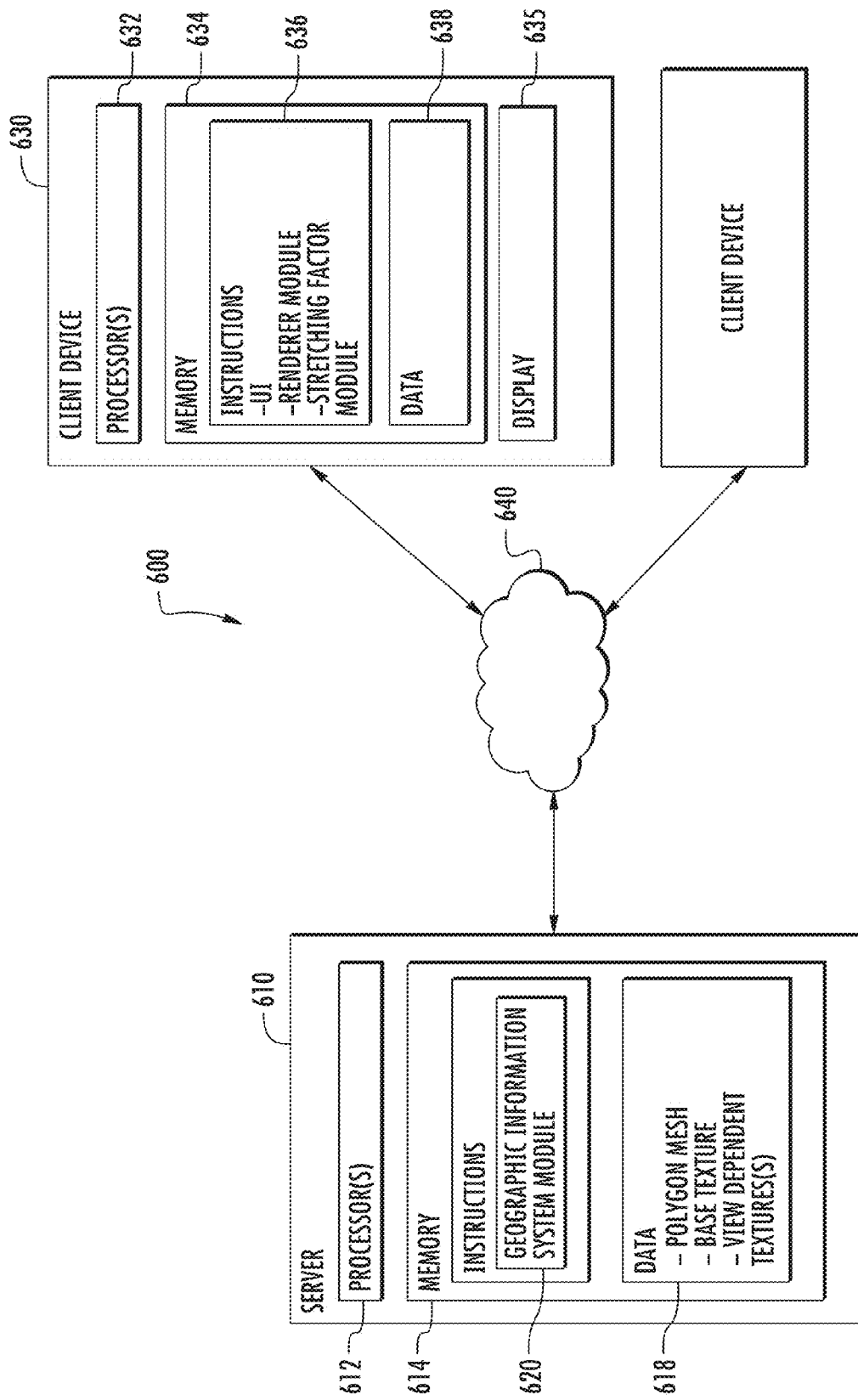

TEXTURE BLENDING BETWEEN VIEW-DEPENDENT TEXTURE AND BASE TEXTURE IN A GEOGRAPHIC INFORMATION SYSTEM

FIELD

The present disclosure relates generally to interactive geographic information systems, and more particularly to rendering view-dependent textures in conjunction with at least a portion of a three-dimensional model in a geographic information system.

BACKGROUND

Geographic information systems provide for the archiving, retrieving, and manipulating of data that has been stored and indexed according to geographic coordinates of its elements. A geographic information system can be used for storing, manipulating, and displaying a three-dimensional model of a geographic area. An interactive geographic information system can present a graphical representation of the three-dimensional model to a user in a suitable user interface, such as a browser. A user can navigate the three-dimensional model by controlling a virtual camera that specifies what portion of the three-dimensional model is rendered and presented to a user.

The three-dimensional model can include a polygon mesh, such as a triangle mesh, used to model the geometry (e.g. terrain, buildings, and other objects) of the geographic area. Geographic imagery, such as aerial or satellite imagery, can be texture mapped to the three-dimensional model so that the three-dimensional model provides a more accurate and realistic representation of the scene. Typically, a single base texture is texture mapped to the polygon mesh regardless of the viewpoint of three-dimensional model. The single base texture can be optimized based on viewing the three-dimensional model from a plurality of differing viewpoints for the scene. For instance, the geographic imagery mapped to each polygon face (e.g. triangle face) in the polygon mesh can be selected according to a selection mechanism or algorithm that favors geographic imagery with a direct or near direct view of the polygon face.

In certain circumstances, a view-dependent texture can be rendered in conjunction with the three-dimensional model when the virtual camera views the three-dimensional model from a perspective associated with a reference viewpoint, such as a canonical viewpoint (e.g. a top-down or nadir perspective, a north perspective, a south perspective, an east perspective, and a west perspective). The view-dependent texture can be optimized for viewing the three-dimensional model from a single view direction associated with the reference viewpoint.

In cases where the virtual camera is not orthographic, objects rendered near the edges of the field of view defined by the virtual camera can be viewed from a direction that is different from the reference direction associated with the view-dependent texture. This can cause visual artifacts in the representation of the three-dimensional model. For instance, taller buildings rendered near the edge of the field of view can have a streaky appearance along the face of the building.

SUMMARY

Aspects and advantages of the invention will be set forth in part in the following description, or may be obvious from the description, or may be learned through practice of the invention.

One exemplary aspect of the present disclosure is directed to a computer-implemented method of rendering a three-dimensional model of a geographic area. The method includes rendering on a display of a computing device a polygon mesh from a virtual camera viewpoint. The polygon mesh models geometry of the geographic area. The method further includes identifying, with the computing device, a reference direction associated with a view-dependent texture to be rendered in conjunction with the polygon mesh. The view-dependent texture is optimized for viewing the three-dimensional model from a reference viewpoint associated with the reference direction. The method further includes determining, with the computing device, a viewpoint direction associated with a fragment of the polygon mesh. The viewpoint direction extends from the virtual camera towards the fragment. The method further include determining, with the computing device, a stretching factor for the fragment based at least in part on the viewpoint direction associated with the fragment and the reference direction. The stretching factor is indicative of the amount that a texture mapped image is stretched when mapped to the fragment. The method further includes selecting, with the computing device, a texture for rendering at the fragment based at least in part on the stretching factor.

In a particular implementation, the view-dependent texture can be selected for rendering at the fragment when the stretching factor is less than a threshold and a base texture can be selected for rendering at the fragment when the stretching factor is greater than the threshold. In certain aspects, a blended texture can be selected for rendering at the fragment. The blended texture can be a blend between the base texture and the view-dependent texture.

Other exemplary aspects of the present disclosure are directed to systems, apparatus, non-transitory computer-readable media, user interfaces and devices for rendering a view-dependent texture in conjunction with a geographic information system.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 2 depicts an exemplary system for rendering a graphical representation of a three-dimensional model of a geographic area according to an exemplary embodiment of the present disclosure;

FIG. 8 depicts a representation of a circular element in two-dimensional texture space projected as an ellipse onto a polygon mesh;

FIG. 9 depicts a flow diagram of an exemplary method for determining a stretching factor for a fragment according to an exemplary embodiment of the present disclosure; and FIG. 10 depicts an exemplary computing environment for rendering a view-dependent texture in conjunction with a three-dimensional model according to an exemplary embodiment of the present disclosure.

DETAILED DESCRIPTION

Figure 1A:
FIG. 1(a)-1(c) depict a graphical representation of an exemplary three-dimensional model including a view-dependent texture mapped to at least a portion of the polygon mesh.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

OVERVIEW

Generally, the present disclosure is directed to rendering a view-dependent texture and a base texture in the same field of view of a virtual camera to provide a graphical representation of a three-dimensional model of a geographic area. The view-dependent texture can be optimized for viewing the three-dimensional model from a single reference direction. The base texture can be optimized based on viewing the three-dimensional model from a plurality of different viewpoints of the three-dimensional model. For instance, the base texture can be optimized for providing a direct (or near direct) and/or non-occluded (or near non-occluded) view of various portions of the three-dimensional model. The view-dependent texture and the base texture can be mapped to a polygon mesh to provide an interactive three-dimensional model of the geographic area for presentation to a user, for instance, on a display device.

More particularly, a user can navigate a virtual camera using controls provided in a suitable user interface to a particular camera viewpoint of the three-dimensional model. The virtual camera defines the field of view of the three-dimensional model to be rendered and presented to the user. When a user navigates the virtual camera to a camera viewpoint of the three-dimensional model associated with or near a reference viewpoint, a view-dependent texture can be rendered in conjunction with at least portions of the three-dimensional model.

Not all portions of the three-dimensional model within the field of view of the virtual camera will have the same orientation relative to the reference direction associated with the reference viewpoint. For instance, portions of the three-dimensional model near the edges of the field of view, such as portions of the model associated with tall buildings, can be viewed from a slightly different direction than the reference direction. According to particular aspects of the present disclosure, a base texture can be rendered at such portions of the three-dimensional model. Combining or "blending" the use of base textures and view-dependent textures can improve the appearance of the three-dimensional model by removing visual artifacts that can occur when rendering a view-dependent texture in conjunction with objects viewed from a slightly different perspective than the reference direction associated with the view-dependent texture.

Figure 1B:
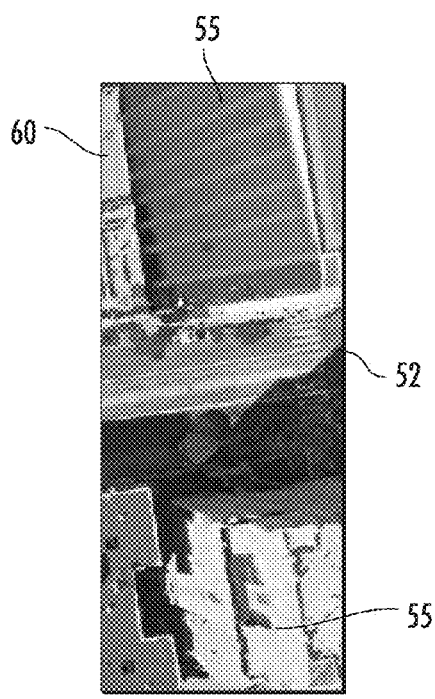
Figure 1C:
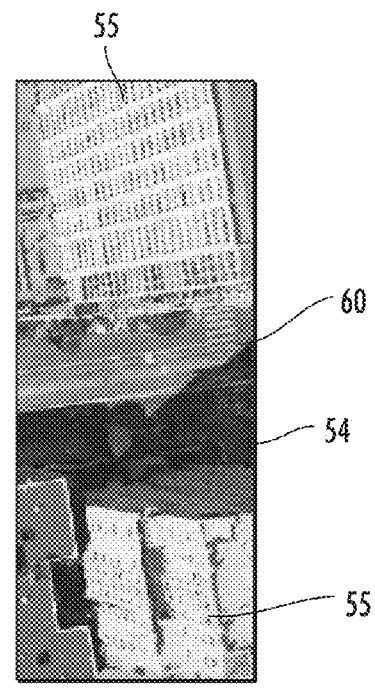

For instance, FIG. 1(*a*) depicts a graphical representation of a three-dimensional model 50 rendered on a display device from a perspective of a virtual camera at a first virtual camera viewpoint. The virtual camera defines the field of view of the three-dimensional model for presentation on the display device. In FIG. 1(*a*), the virtual camera provides a perspective of the three-dimensional model from a viewpoint associated with a reference direction, namely a nadir perspective (i.e. a top-down view). A view-dependent texture 52 is rendered in conjunction with the three-dimensional model. In particular, the view-dependent texture 52 can be texture mapped to a three-dimensional polygon mesh representing geometry of the geographic area. The view-dependent texture 52 can be optimized for viewing the three-dimensional model from the reference direction. In particular, the view-dependent texture can be generated from source images that are more closely aligned with the reference direction.

Due to the non-orthographic nature of the virtual camera, certain portions of the three-dimensional model 50 are viewed from a slightly different perspective than the reference direction. For instance, window 60 calls attention to certain portions of the three-dimensional model. The portions of the three-dimensional model 50 in the window 60 are near the edges of the field of view defined by the virtual camera and are viewed from a slightly different perspective than the remainder of the three-dimensional model 50, such as the portions near the center of the field of view. As demonstrated in the blowup of window 60 depicted in FIG. 1(*b*), rendering the view-dependent texture associated with the nadir perspective in conjunction with these portions of the three-dimensional model 50 can lead to visual anomalies. For instance the sides of the buildings 55 have a streaky appearance.

FIG. 1(*c*) depicts a blow up of window 60 when a base texture 54 is rendered in conjunction with the three-dimensional model 50. As shown, the sides of the buildings 55 have an improved and more realistic appearance when compared to the view-dependent texture 52 depicted in FIG. 1(*b*). Accordingly, rendering the base texture for these portions of three-dimensional model 50 can improve the quality of the three-dimensional model 50.

According to particular aspects of the present disclosure, a computing device can decide for each portion (e.g. pixel) of graphical representation of the three-dimensional model, whether to render the base texture or the view-dependent texture in conjunction with the polygon mesh. In particular, a stretching factor can be determined for each fragment in the polygon mesh. Each fragment in the polygon mesh can correspond to a pixel in the graphical representation of the three-dimensional model to be rendered on a display device. The stretching factor can be indicative of the amount a texture mapped image is stretched when mapped to the fragment. The stretching factor can be determined based on the relationship between the reference direction and a viewpoint direction at the fragment. The viewpoint direction can extend from the virtual camera towards the fragment. Other suitable factors can be used in the determination of the stretching factor, such as a surface normal associated with the fragment.

The computing device can select the base texture, the view-dependent texture, or a blended texture for rendering at the fragment based at least in part on the stretching factor. For instance, in one implementation, the stretching factor can be compared to a threshold. The view-dependent texture can be selected for rendering at the fragment when the stretching factor is less than a threshold. The base texture can be selected for rendering at the fragment when the stretching factor is greater than the threshold. In certain cases, a blended texture can be selected for rendering at the fragment. The blended texture can be a blend of the base texture and the view-dependent texture.

Any suitable technique can be used to determine the stretching factor for each fragment of the polygon mesh. In one exemplary embodiment, the stretching factor can be determined by accessing a mathematical model that projects a circular element in the two-dimensional space associated with the view-dependent texture (e.g. the texture atlas associated with the view-dependent texture) as an ellipse onto the polygon mesh. The ellipse can include a minor axis and a major axis. The major axis can be indicative of the stretch of a texture mapped image when mapped to a fragment of the polygon mesh. The stretching factor can be determined, based at least in part on the major axis of the ellipse. For instance, the stretching factor can be determined based on the length of the projection of the major axis of the ellipse in the graphical representation of the three-dimensional model presented on a display device.

In another exemplary embodiment, the stretching factor can include an inverse texture stretch component and a view stretch component. The inverse texture stretch component can be based on the relationship between the reference direction and a surface normal. The view stretch component can be based on the relationship between the surface normal associated with the fragment and the viewpoint direction associated with the fragment. The computing device can select whether to render the view-dependent texture or the base texture at a fragment based on both the inverse texture stretch and the view stretch.

In this way, a three-dimensional model with an improved appearance can be presented to the user. When a user navigates to a reference direction, a view-dependent texture can be presented to the user to provide a more realistic appearing graphical representation of the geographic area to the user. The appearance of the view-dependent texture can be even further enhanced by rendering a base texture in conjunction with the view-dependent texture for portions of the three-dimensional model within the same field of view that are observed from a direction that is different from the reference direction.

Exemplary System For Rendering a Three-Dimensional Model of a Geographic Area FIG. 2 depicts an exemplary system 100 for rendering a three-dimensional model of a geographic area according to an exemplary embodiment of the present disclosure. The system 100 can include a server 110 for hosting a geographic information system 120. The server 110 can be any suitable computing device, such as a web server. The server 110 can be in communication with a user device 130 over a network 140, such as the Internet. The user device 130 can be any suitable computing device, such as a laptop, desktop, smartphone, tablet, mobile device, wearable computing device, or other computing device.

The server 130 can host an interactive geographic information system 120 that serves geographic data stored, for instance, in a geographic database 118. The geographic database 118 can include geographic data for rendering an interactive graphical representation of the three-dimensional model of a geographic area. The geographic data can include a polygon mesh representing the geometry of the geographic area and one or more textures for mapping to the polygon mesh. The geographic data can be stored in a hierarchical tree data structure, such a quadtree or octree data structure, that spatially partitions the geographic data according to geospatial coordinates.

The polygon mesh can include a plurality of polygons (e.g. triangles) interconnected by vertices and edges to model the geometry of the geographic area. The polygon mesh can be represented in any suitable format, such as a depth map, height field, closed mesh, signed distance field, or any other suitable type of representation. The polygon mesh can be a stereo reconstruction generated from aerial or satellite imagery of the geographic area. The imagery can be taken by overhead cameras, such as from an aircraft, at various oblique or nadir perspectives. In the imagery, features are detected and correlated with one another. The points can be used to determine a stereo mesh from the imagery such that a three-dimensional model can be determined from two-dimensional imagery.

The geographic data can also include a plurality of textures that can be mapped to the polygon mesh. The textures can be generated from aerial or satellite imagery of the geographic area. According to aspects of the present disclosure, the geographic data can include a base texture for the geographic area and one or more view-dependent textures for reference viewpoints (e.g. canonical viewpoints) of the geographic area. In one implementation there is a view-dependent texture for some, but not all, viewing angles of the model. For instance, in a particular implementation, the geographic data can include a base texture and five different view-dependent textures, one for each of a north 45° oblique viewpoint, a south 45° oblique viewpoint, a west 45° oblique viewpoint, and a nadir viewpoint. The textures can be stored in any suitable format, such as using texture atlases. As used herein, a canonical viewpoint can refer to a standard and/or a predominate view of a geographic area, such as a north view, a south view, an east view, or a west view. Other suitable canonical viewpoints can include a northeast view, a northwest view, a southeast view, or southwest view. The canonical views can be standard or default views of the three-dimensional model in the geographic information system.

The base texture can be optimized based on a plurality of differing viewpoints of the three-dimensional model. An exemplary base texture is optimized for providing a direct (or near direct) and/or a non-occluded (or near non-occluded) view of various portions of the three-dimensional model. In one implementation, the base texture can be generated by selecting source images for texture mapping to polygon faces in the polygon mesh using selection criteria that favors the selection of source images that have a non-occluded and/or direct or near direct view of the polygon face. The source images used for the base texture can be associated with a variety of different view perspectives.

The view-dependent textures can be optimized for viewing the three-dimensional model from a single view direction (i.e. the reference direction) associated with the reference viewpoint. In particular, a view-dependent texture can be generated from source images that are more closely aligned with the reference direction. In one implementation, the view-dependent texture can be generated by creating a texture atlas mapping texture to the polygon mesh providing a representation of the geometry of the geographic area. The texture for each portion of the polygon mesh can be selected using a texture selection algorithm that favors source imagery more closely aligned with the single view direction associated with the reference direction.

In a particular implementation, a view-dependent texture can be generated by determining a score for each source image that views a polygon face of the polygon mesh. The score can favor the selection of a source image for texturing a polygon face that is aligned more closely with the reference direction. In one particular implementation, the score computed for each source image can include a base component and a view dependent component. The base component can be determined to favor source images that directly point to a surface normal associated with the polygon face. The base component can also take into account other factors, such as occlusion of the polygon face in the source image. The view dependent component can be based on the relationship between the camera view direction associated with the source image (e.g. the position and orientation of the camera that captured the source image) and the reference direction associated with the view-dependent texture. The view dependent component can dominate the computation of the score for each source image. A graph cut algorithm can also be used in the generation of the base texture and the view-dependent texture to avoid choosing images that cause large color discontinuities when textured onto the polygon mesh.

The user device 130 can implement a user interface 134 that allows a user 132 to interact with the geographic information system 120 hosted by the server 110. The user interface 134 can be a browser or other suitable client application that can render a graphical representation of a three-dimensional model of the geographic area on a display associated with the user device 130. The user 132 can interact with the user interface 134 to navigate a virtual camera to view the three-dimensional model from a variety of different virtual camera viewpoints. For instance, the user interface 134 can present a variety of different control tools to allow the user to pan, tilt, zoom, search, or otherwise navigate the virtual camera to view different portions of the three-dimensional model of the geographic area from different perspectives.

In response to the user interactions with the user interface 134, requests for geographic data can be provided from the user device 130 over the network 140 to the server 110. The server 110 can provide geographic data, such as a polygon mesh and one or more textures, to the user device 130. The user device 130 can then render one or more of the textures in conjunction with the polygon mesh from a viewpoint associated with the virtual camera to present a graphical representation of the three-dimensional model of the geographic area to the user.

When the user navigates the virtual camera to a virtual camera viewpoint that is not associated with a reference direction, the base texture can be rendered in conjunction with the three-dimensional model. When the user navigate the virtual camera to a virtual camera viewpoint that is associated with a reference direction, a view-dependent texture for the reference direction can be rendered in conjunction with at least portions of the three-dimensional model. As will be discussed in detail below, the user device 130 can render a base texture in the same field of view as the view-dependent texture for portions of the three-dimensional model that are viewed from a view direction that is different than the reference direction.

Exemplary Method For Rendering a
View-Dependent Texture

Figure 3:
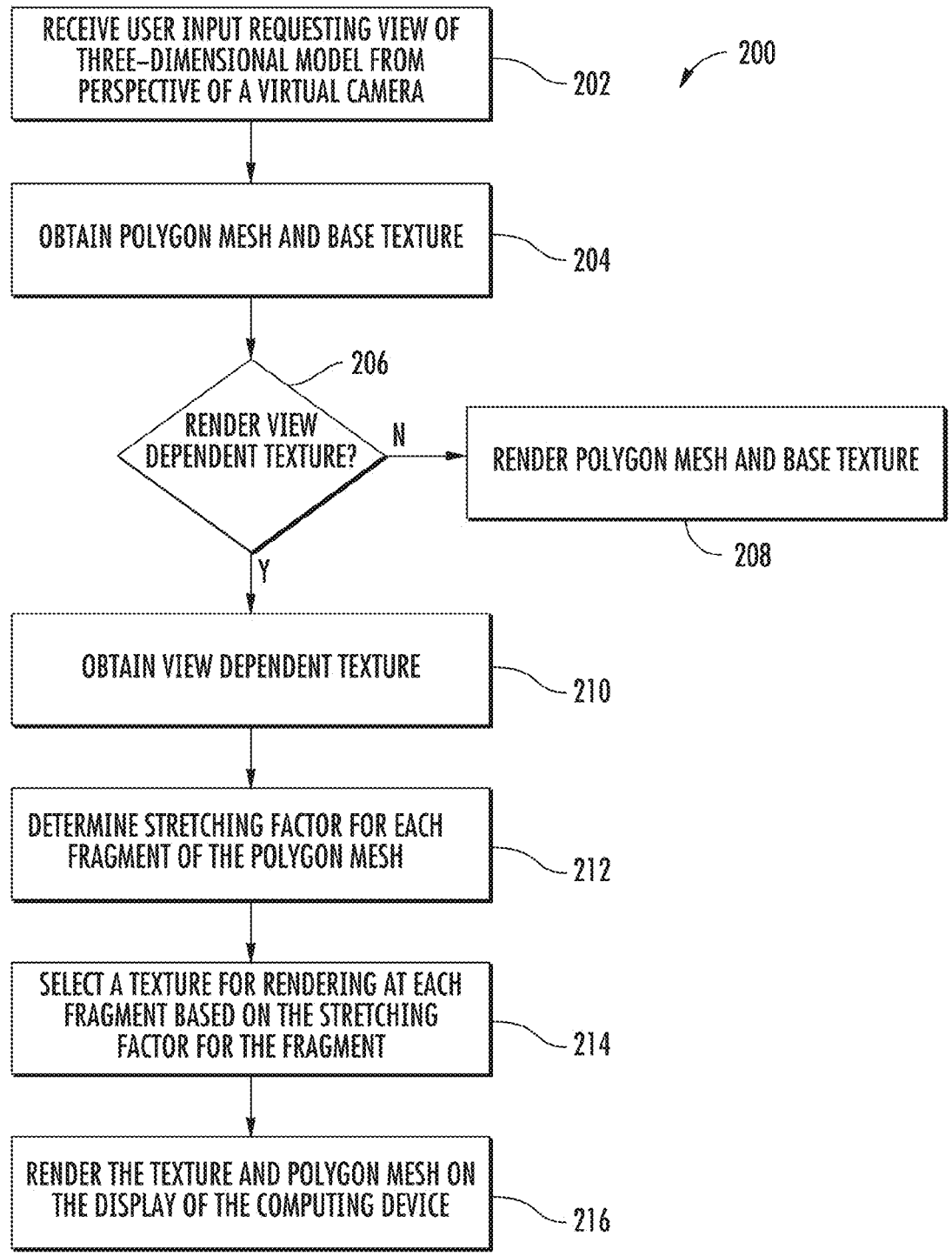
FIG. 3 depicts a flow diagram of an exemplary method for rendering a view-dependent texture in conjunction with a three-dimensional model of a geographic area according to an exemplary embodiment of the present disclosure.

FIG. 3 depicts a flow diagram of an exemplary method (200) for rendering a view-dependent texture in conjunction with a three-dimensional model of a geographic area according to an exemplary embodiment of the present disclosure. The method (200) can be implemented using any suitable computing system, such as the user device 130 depicted in FIG. 1. In addition, FIG. 3 depicts steps performed in a particular order for purposes of illustration and discussion. One of ordinary skill in the art, using the disclosures provided herein, will understand that the steps of any of the methods discussed herein can be omitted, adapted, rearranged, or expanded in various ways without deviating from the scope of the present disclosure.

At (202), the method includes receiving a user input requesting a view of a three-dimensional model of a geographic area from a virtual camera viewpoint. For instance, a user can navigate a virtual camera using a suitable user interface to view the three-dimensional model from a perspective of the virtual camera viewpoint. The virtual camera viewpoint can be associated with a position and orientation of the virtual camera relative to the three-dimensional model. The virtual camera can define the field of view of the three-dimensional model. The virtual camera can be non-orthographic such that certain portions of the three-dimensional model are viewed from a different direction than other portions of the three-dimensional model. For instance, portions of the three-dimensional model proximate the edges of the field of view can be viewed from different directions than portions of the three-dimensional model near the center of the field of view.

At (204), a polygon mesh modeling geometry of the geographic area and a base texture for the three-dimensional model can be obtained, for instance, over a network or from memory. For example, if data associated with the polygon mesh and the base texture have previously been fetched from a remote server, the polygon mesh and the base texture can be accessed from a local memory. If the data associated with the polygon mesh and the base texture are not available in a local memory, a request can be made to fetch the data from a remote server over a network, such as the Internet.

At (206), it can be determined whether to render a view-dependent texture in conjunction with the three-dimensional model. For instance, it can be determined whether to render a view-dependent texture based on the difference between a virtual camera viewpoint associated with the virtual camera and the reference direction associated with a view-dependent texture. The decision to render a view-dependent texture can also be based on the available bandwidth/memory for rendering the view-dependent texture. If it is determined not to render a view-dependent texture in conjunction with the three-dimensional model, the method can render the polygon mesh and the base texture to provide a graphical representation of the three-dimensional model (208). If it is determined to render a view-dependent texture, the method can obtain the view-dependent texture associated with the reference direction (210). For instance, the view-dependent texture can be accessed from a local memory and/or fetched from a remote computing device over a network.

At (212), the method includes determining a stretching factor for each fragment of the polygon mesh. The stretching factor can be indicative of how much the view of the fragment from the perspective of the virtual camera differs from the reference direction associated with the view-dependent texture. More particularly, the stretching factor can be determined based on a viewpoint direction associated with the fragment and the reference direction. A fragment associated with a viewpoint direction that is closely aligned with the reference direction can have a stretching factor favoring selection of a view-dependent texture for rendering at the fragment. A fragment associated with a viewpoint direction that differs sufficiently from the reference direction can have a stretching factor favoring the selection of the base texture for rendering at the fragment. The stretching factor can be determined based on other factors as well, such as a surface normal associated with the fragment. Exemplary techniques for determining a stretching factor according to aspects of the present disclosure will be discussed in detail below with reference to FIGS. 7-9.

Referring back to FIG. 3 at (214), a texture is selected for rendering at the fragment based on the stretching factor. In particular, the view-dependent texture or the base texture can be selected for rendering at the fragment based on the stretching factor. For instance, in one embodiment, the base texture can be selected for rendering at the fragment if the stretching factor is greater than a threshold. The view-dependent texture can be selected for rendering at the fragment when the stretching factor is less than the threshold. In another exemplary embodiment, a blended texture can be selected for rendering at the fragment. The blended texture can be a blend between the color defined by the base texture for the fragment and the color defined by the view-dependent texture for the fragment.

Figure 4:
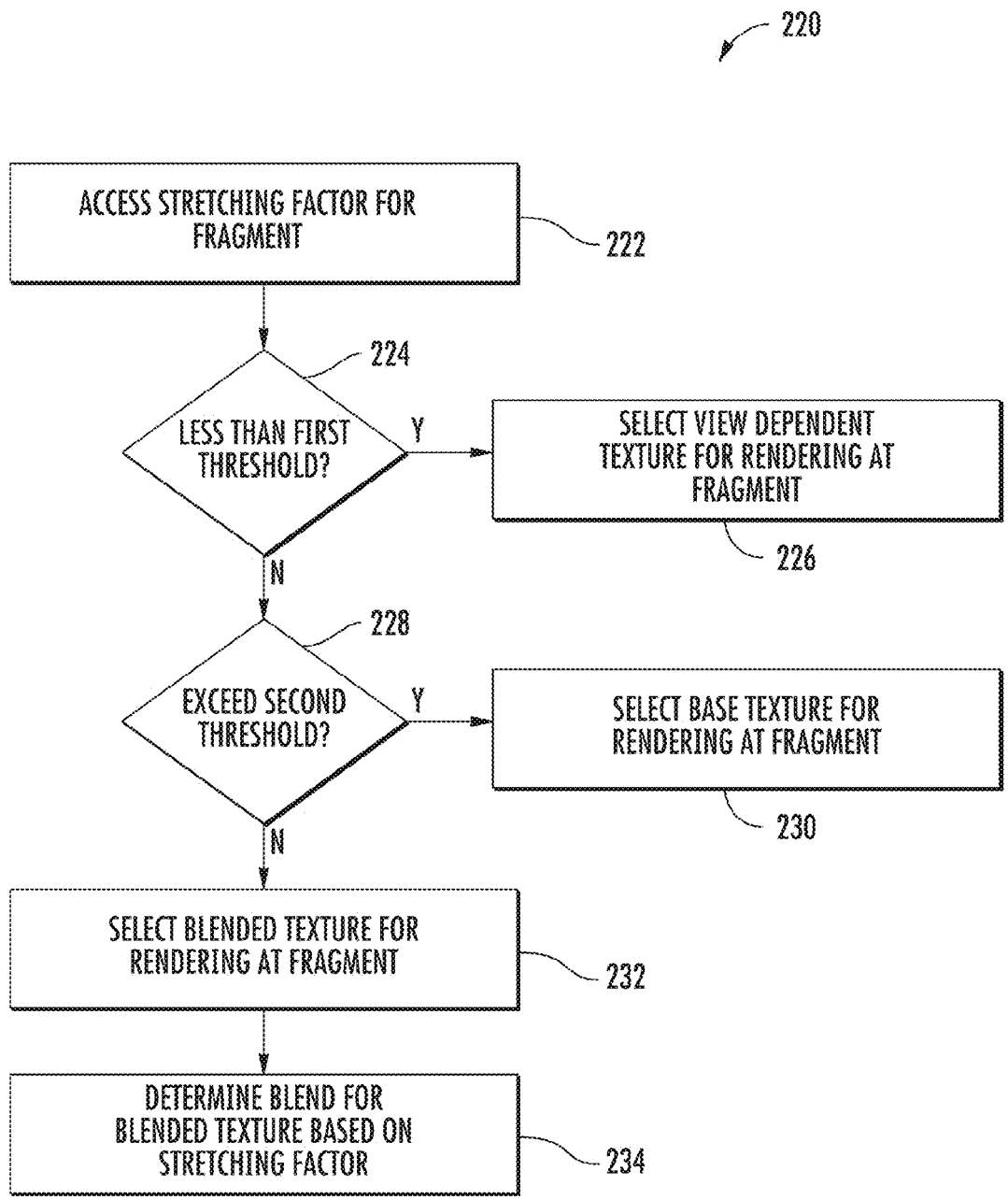
FIG. 4 depicts a flow diagram of an exemplary method for selecting a texture for rendering at a fragment based on a stretching factor for the fragment according to an exemplary embodiment of the present disclosure.

FIG. 4 depicts a flow diagram of one exemplary method for selecting a texture for rendering at a fragment according to an exemplary embodiment of the present disclosure. At (222), the stretching factor for the fragment is accessed, for instance, from a memory. At (224), it can be determined whether the stretching factor is less than a first threshold. The first threshold can be set to any suitable value depending on desired performance. If the stretching factor is less than the first threshold, the view-dependent texture can be selected for rendering at the fragment (226).

Otherwise, the method proceeds to (228) where it is determined whether the stretching factor exceeds a second threshold. The second threshold can be set to any suitable value depending desired performance. If the stretching factor exceeds the second threshold, the base texture can be selected for rendering at the fragment (230).

If the stretching factor does not exceed the second threshold, a blended texture can be selected for rendering at the fragment (232). The blended texture can be a blend between the view-dependent texture and the base texture. At (234), the amount of the blended texture attributable to the view-dependent texture and the amount of the blended texture attributable to the base texture can be determined based on the stretching factor. For instance, alpha values associated with the base texture and the view-dependent texture can be controlled based on the stretching factor.

Figure 5:
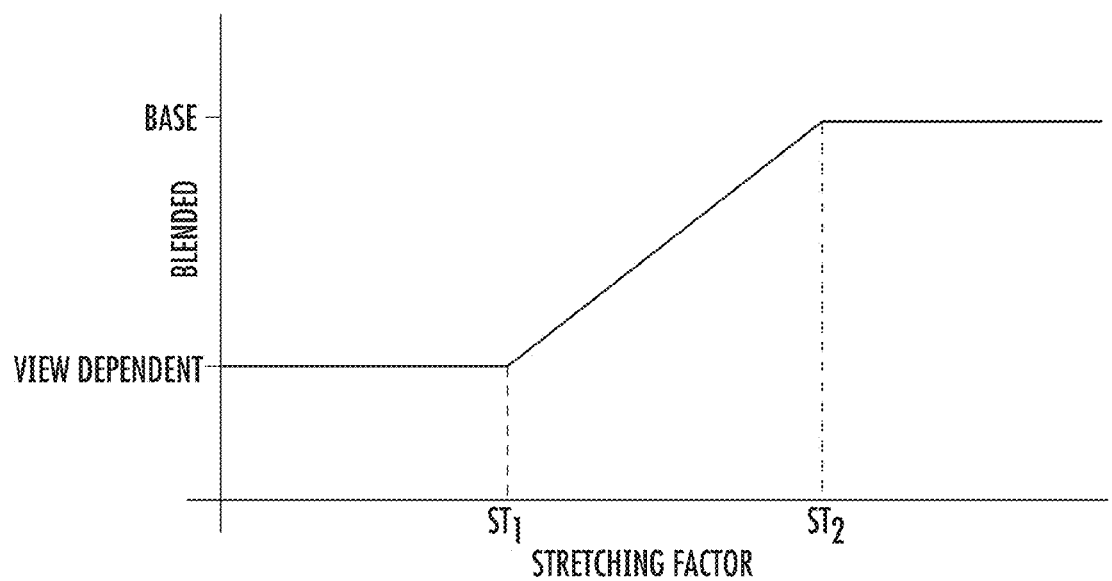
FIG. 5 graphically depicts the exemplary selection of a texture for rendering at a fragment based on a stretching factor for the fragment according to an exemplary embodiment of the present disclosure.

FIG. 5 depicts a graphical representation of selecting a texture for rendering at the fragment using the exemplary method (220) shown in FIG. 4. As demonstrated in FIG. 5, the view-dependent texture can be selected for rendering at the fragment when the stretching factor is less than a first threshold $ST_1$. When the stretching factor is greater than a second threshold $ST_2$, the base texture can be selected for rendering at the fragment. When the stretching factor is in a blend range between $ST_1$ and $ST_2$, a blended texture can be selected for rendering at the fragment. The ratio of the blend of the blended texture can be determined based on the stretching factor. For instance, as the stretching factor approaches the second threshold $ST_2$, more and more of the blended texture can be attributable to the base texture while less and less of the blended texture is attributable to the view-dependent texture. The blend can vary linearly with the stretching factor as shown in FIG. 5. However, other suitable relationships can be used to determine the blend ratio of the blended texture without deviating from the scope of the present disclosure.

Referring back to FIG. 3 at (216), the selected texture can be rendered at the fragment on the display of the computing device in conjunction with the three-dimensional model. In this manner, the method (200) can render the view-dependent texture at fragments where the viewpoint direction is closely aligned with the reference direction and can render the base texture at fragments where the viewpoint direction differs from the reference direction.

Figure 6:
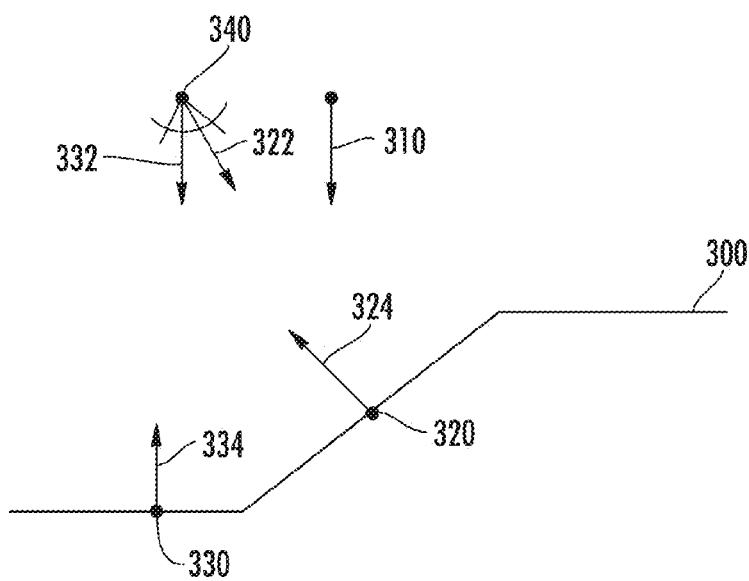
FIG. 6 depicts the exemplary determination of a stretching factor for different fragments of a polygon mesh according to an exemplary embodiment of the present disclosure.

The exemplary method (200) of rendering view-dependent textures in conjunction with a three-dimensional model of a geographic area can be more readily understood with reference to FIG. 6. FIG. 6 depicts the exemplary determination of a stretching factor for different fragments of a polygon mesh according to an exemplary embodiment of the present disclosure. In particular, FIG. 6 depicts a polygon mesh 300 having a plurality of polygon faces. First and second fragments 320 and 330 of the polygon mesh are singled out for analysis for purposes of illustration and discussion. Each of the first and second fragments 320 and 330 can be associated with a different pixel in a graphical representation of the polygon mesh 300 presented on a display device. A view-dependent texture can be identified for rendering in conjunction with the polygon mesh 300. The view-dependent texture can have a reference direction 310.

A user can request a view of the polygon mesh 300 from the perspective associated with a virtual camera 340. Stretching factors can be determined for the first and second fragment 330 and 330. In particular, the stretching factor for the first fragment 320 can be determined based on the viewpoint direction 322 associated with the first fragment 320 and the reference direction 310. The viewpoint direction 322 associated with the first fragment 320 extends from the virtual camera 340 to the first fragment 320. In particular implementations, the stretching factor can also be determined based at least in part on the surface normal 324 associated with the first fragment 320.

The stretching factor for the second fragment 320 can be determined based on the viewpoint direction 332 associated with the second fragment 330 and the reference direction 310. The viewpoint direction 322 associated with the second fragment extends from the virtual camera 340 to the second fragment 330. In particular implementations, the stretching factor can also be determined based at least in part on the surface normal 334 associated with the first fragment 330.

As demonstrated in FIG. 6, the viewpoint direction 332 associated with the second fragment 330 is more closely aligned with the reference direction 310 than the viewpoint direction 322 associated with the first fragment 320. As a result, the stretching factor associated with the first fragment 320 can be greater than the stretching factor associated with the second fragment 330. Accordingly, a base texture can be selected for rendering at the first fragment 320 and a view-dependent texture can be selected for rendering at the second fragment 330.

Exemplary Methods For Determining a Stretching Factor

Figure 7:
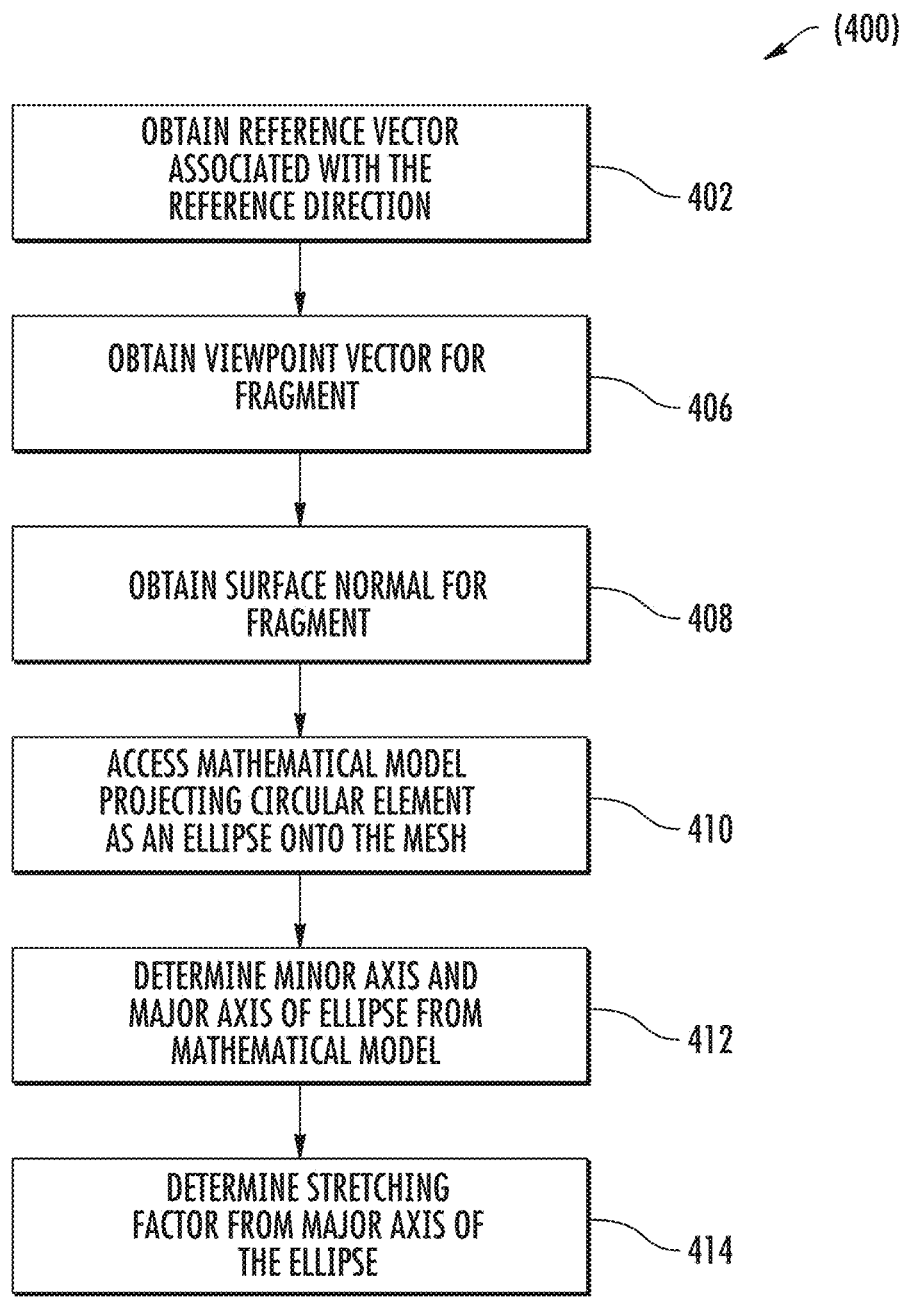
FIG. 7 depicts a flow diagram of an exemplary method for determining a stretching factor for a fragment according to an exemplary embodiment of the present disclosure.

With reference now to FIGS. 7-9, exemplary techniques for determining a stretching factor for a fragment of a polygon mesh will be set forth. These exemplary techniques are presented for purposes of illustration and discussion. Those of ordinary skill in the art, using the disclosures provided herein, will understand that other suitable techniques can be used for determining the stretching factor without deviating from the scope of the present disclosure.

FIG. 7 depicts an exemplary method (400) for determining a stretching factor for a fragment according to one exemplary embodiment of the present disclosure. The method (400) determines a stretching factor using a mathematical model that projects a circular element in a two-dimensional space associated with the view-dependent texture as an ellipse onto the polygon mesh.

More particularly, FIG. 8 depicts a circular element 350 in a texture space associated with the view-dependent texture. When the circular element 350 is projected onto different fragments of the polygon mesh, the circular element will stretch to form an ellipse 360. The size and shape of the ellipse 360 will vary depending on the fragment to which the circular element is projected. As shown, the ellipse 360 includes a minor axis r and a major axis s. There is no stretch is the minor axis direction. The stretch is along the major axis s. Accordingly, the stretching factor can be determined based at least in part on the major axis of the ellipse.

More particularly, a reference vector associated with the reference direction of the view-dependent texture can be obtained at (402). The reference vector can be a unit vector that points in the reference direction associated with the view-dependent texture. Referring to FIG. 6, the reference vector can extend in the reference direction 310.

Referring back to FIG. 7, a viewpoint vector can be obtained for the fragment at (404). The viewpoint vector can also be a unit vector and can point along the viewpoint direction associated with the fragment. As discussed above, the viewpoint direction extends from the virtual camera to the fragment. Referring to the example of FIG. 6, the first fragment 320 can have a viewpoint vector that points along the viewpoint direction 322. The second fragment 330 can have viewpoint vector that points along the viewpoint direction 332.

Referring back to FIG. 8, a surface normal can also be obtained for the fragment (406). The surface normal can be obtained by either determining the surface normal for the fragment or accessing a previously determined surface normal for the fragment stored in a memory. Many different techniques are known for determining the surface normal of a fragment of a polygon mesh. Any suitable technique can be used without deviating from the scope of the present disclosure. Referring to the example of FIG. 6, the first fragment 320 has a surface normal 324. The second fragment 330 has a surface normal 334.

Referring to FIG. 7 at (408), a mathematical model projecting a circular element as an ellipse on the polygon mesh can be accessed. The mathematical model can specify the minor axis of the ellipse based at least in part on the relationship between the surface normal at the fragment and the reference direction. For instance, the mathematical model can specify the minor axis of the ellipse as the cross product of the reference vector and the surface normal as follows:

$$r = \mathrm{cross}(v, n)$$

where r is the minor axis of the ellipse, v is the reference vector, and n is the surface normal.

The mathematical model can specify the direction of the major axis of the ellipse based on the relationship between the minor axis of the ellipse and the surface normal. For instance, the mathematical model can specify that the direction of major axis extends in the direction defined by the cross product of the minor axis and the surface normal as follows:

$$\text{Direction of } s = \mathrm{cross}(r, n)$$

where s is the major axis of the ellipse, r is the minor axis of the ellipse, and n is the surface normal.

The mathematical model can further specify that magnitude of the major axis is determined based on the relationship between the reference direction and the surface normal. For instance, the mathematical model can specify that the magnitude of the major axis is determined based on the dot product of the reference vector and the surface normal as follows:

$$\text{Magnitude of } s = |1/\mathrm{dot}(v, n)|$$

where s is the major axis of the ellipse, v is the reference vector, and n is the surface normal.

At (410), the major axis and the minor axis of the ellipse are determined from the mathematical model. In particular, the reference vector and the surface normal obtained for the fragment can be used to solve for minor axis and major axis of the ellipse using the mathematical model. At (412), the stretching factor is determined from the major axis of the ellipse. For instance, the stretching factor can be determined based on the relationship between the major axis of the ellipse and the viewpoint direction associated with the fragment. In one particular implementation, the stretching factor can be determined as follows:

$$\mathrm{Stretch}_f = |(\|s\| * (1 - \mathrm{dot}(s/\|s\|, e))|$$

where $\mathrm{Stretch}_f$ is the stretching factor associated with the fragment, s is the major axis of the ellipse, and e is the viewpoint vector associated with the fragment. The stretching factor can be used to select a texture for rendering at the fragment.

FIG. 9 depicts a flow diagram of another exemplary method (500) for determining a stretching factor for a fragment according to an exemplary embodiment of the present disclosure. The method (500) determines a stretching factor having an inverse texture stretch component for the fragment and a view stretch component for the fragment. The inverse texture stretch component can be determined based on the relationship between the reference direction and a surface normal associated with the fragment. The view stretch component can be determined based on the relationship between the viewpoint direction and the surface normal associated with the fragment.

More particularly, a reference vector and surface normal can be obtained for the fragment at (502). The reference vector can be a unit vector that points in the reference direction associated with the view-dependent texture. The surface normal for the fragment can be accessed from memory or determined using any suitable surface normal determination algorithm.

At (504), the inverse texture stretch component is determined based on the reference vector and the surface normal. The inverse texture stretch component can have a value ranging from 0 to 1. For instance, the inverse texture stretch component can be computed as the dot product of the reference vector and the surface normal as follows:

$$s0 = \mathrm{dot}(v, n)$$

where s0 is the inverse texture stretch component, v is the reference direction, and n is the surface normal.

In one example where the view-dependent texture is for a nadir perspective (i.e. is associated with a top-down reference direction), the inverse texture stretch component can be 0 for fragments associated with vertical walls and other geometry that has a surface normal perpendicular to the reference direction. The inverse texture stretch component can be 1 for fragments associated with roofs and other geometry that has a surface normal parallel to the reference direction.

At (506), a viewpoint vector can be obtained for the fragment. The viewpoint vector can be a unit vector and can point along the viewpoint direction associated with the fragment.

The view stretch component is determined based on the viewpoint vector at (508). In particular, the view stretch component can be determined based on the relationship between the viewpoint vector and the surface normal. For instance, the view stretch component can be 0 when squarely viewing the fragment and can be 1 when looking at the polygon face associated with the fragment edge-on. In a particular implementation, the view stretch component can be determined based on the dot product of the viewpoint vector and the surface normal as follows:

$$s1 = \text{dot}(n, e)$$

where s1 is the view stretch component, e is the viewpoint vector, and n is the surface normal.

A texture can be selected for rendering at the fragment based on both the inverse texture stretch component associated with the fragment and the view stretch component associated with the fragment. For example, the view-dependent texture can be selected for rendering at the fragment when $s1 \geq s0 - \alpha$. A base texture can be selected for rendering at the fragment when $s0 \leq s1 - \beta$. $\alpha$ and $\beta$ are constants that can be controlled based on the desired amount of stretching to be allowed for the view-dependent texture.

Exemplary Computing Environment For Rendering A View-Dependent Texture in Conjunction with a Three-Dimensional Model FIG. 10 depicts an exemplary computing system 600 that can be used to implement the methods and systems for generating and rendering view-dependent textures according to aspects of the present disclosure. The system 600 is implemented using a client-server architecture that includes a server 610 that communicates with one or more client devices 630 over a network 640. The system 600 can be implemented using other suitable architectures, such as a single computing device.

The system 600 includes a server 610, such as a web server used to host a geographic information system. The server 610 can be implemented using any suitable computing device(s). The server 610 can have a processor(s) 612 and a memory 614. The server 610 can also include a network interface used to communicate with one or more client computing devices 630 over a network 640. The network interface can include any suitable components for interfacing with one more networks, including for example, transmitters, receivers, ports, controllers, antennas, or other suitable components.

The processor(s) 612 can be any suitable processing device, such as a microprocessor, microcontroller, integrated circuit, or other suitable processing device. The memory 614 can include any suitable computer-readable medium or media, including, but not limited to, non-transitory computer-readable media, RAM, ROM, hard drives, flash drives, or other memory devices. The memory 614 can store information accessible by processor(s) 612, including instructions 616 that can be executed by processor(s) 612. The instructions 616 can be any set of instructions that when executed by the processor(s) 612, cause the processor(s) 612 to provide desired functionality. For instance, the instructions 616 can be executed by the processor(s) 612 to implement a geographic information system module 620. The geographic information system module 620 can be configured to perform functionality associated with hosting a geographic information system, such as responding to requests for geographic data used to render a three-dimensional model of a geographic area.

It will be appreciated that the term "module" refers to computer logic utilized to provide desired functionality. Thus, a module can be implemented in hardware, application specific circuits, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM, hard disk or optical or magnetic media.

Memory 614 can also include data 618 that can be retrieved, manipulated, created, or stored by processor(s) 612. The data can include geographic data to be served as part of the geographic information system, such as polygon meshes, base textures, view-dependent textures, and other geographic data. The geographic data can be stored in a hierarchical tree data structure, such as a quadtree or octree data structure, that spatially partitions the geographic data according to geospatial coordinates. The data 618 can be stored in one or more databases. The one or more databases can be connected to the server 610 by a high bandwidth LAN or WAN, or can also be connected to server 610 through network 640. The one or more databases can be split up so that they are located in multiple locales.

The server 610 can exchange data with one or more client devices 630 over the network 640. Although two client devices 630 are illustrated in FIG. 10, any number of client devices 630 can be connected to the server 610 over the network 640. The client devices 630 can be any suitable type of computing device, such as a general purpose computer, special purpose computer, laptop, desktop, mobile device, smartphone, tablet, wearable computing device, or other suitable computing device.

Similar the computing device 610, a client device 630 can include a processor(s) 632 and a memory 634. The processor(s) 632 can include one or more central processing units, graphics processing units dedicated to efficiently rendering images, etc. The memory 634 can store information accessible by processor(s) 632, including instructions 636 that can be executed by processor(s) 632. For instance, the memory 634 can store instructions 636 for implementing an application that provides a user interface (e.g. a browser) for interacting with the geographic information system.

The memory 634 can also store instructions 636 for implementing a rendering module and a stretching factor module. The rendering module can be configured to render a textured polygon mesh to provide a graphical representation of a three-dimensional model of a geographic area. The stretching factor module can be configured to determine a stretching factor for each fragment of the polygon mesh to be presented to a user. The renderer module can select a view-dependent texture or a base texture for rendering at each fragment based at least in part on the stretching factor The memory 634 can also store data 638, such as polygon meshes, base textures, view-dependent textures, and other geographic data received by the client device 630 from the server 610 over the network. The geographic data can be stored in a hierarchical tree data structure that spatially partitions the geographic data according to geospatial coordinates associated with the data.

The client device 630 can include various input/output devices for providing and receiving information from a user, such as a touch screen, touch pad, data entry keys, speakers, and/or a microphone suitable for voice recognition. For instance, the computing device 630 can have a display 635 for rendering the graphical representation of the three-dimensional model.

The client device 630 can also include a network interface used to communicate with one or more remote computing devices (e.g. server 610) over the network 640. The network interface can include any suitable components for interfacing with one more networks, including for example, transmitters, receivers, ports, controllers, antennas, or other suitable components.

The network 640 can be any type of communications network, such as a local area network (e.g. intranet), wide area network (e.g. Internet), or some combination thereof. The network 640 can also include a direct connection between a client device 630 and the server 610. In general, communication between the server 610 and a client device 630 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of rendering a three-dimensional model of a geographic area, comprising:
    rendering on a display of a computing device a polygon mesh from a perspective of a virtual camera, the polygon mesh modeling geometry of the geographic area;
    identifying, with the computing device, a reference direction associated with a view-dependent texture to be rendered in conjunction with the polygon mesh, the view-dependent texture optimized for viewing the three-dimensional model from a reference viewpoint associated with the reference direction;
    determining, with the computing device, a viewpoint direction associated with a fragment of the polygon mesh, the viewpoint direction extending from the virtual camera towards the fragment;
    determining, with the computing device, a stretching factor for the fragment based at least in part on the viewpoint direction associated with the fragment and the reference direction, the stretching factor indicative of the amount that a texture mapped image is stretched when mapped to the fragment; and
    selecting, with the computing device, a texture for rendering at the fragment based at least in part on the stretching factor;
    wherein the stretching factor has an inverse texture stretch component for the fragment and a view stretch component for the fragment.

2. The computer-implemented method of claim 1, wherein the method comprises rendering the texture selected for rendering at the fragment on the display of the computing device in conjunction with the polygon mesh.

3. The computer-implemented method of claim 1, wherein the view-dependent texture is selected for rendering at the fragment when the stretching factor is less than a threshold.

4. The computer-implemented method of claim 1, wherein a base texture is selected for rendering at the fragment when the stretching factor is greater than a threshold, the base texture optimized based on viewing the three-dimensional model from a plurality of different viewpoints.

5. The computer-implemented method of claim 1, wherein a blended texture is selected for rendering at the fragment based at least in part on the stretching factor, the blended texture comprising a blend between a base texture and the view-dependent texture, the base texture optimized based on viewing the three-dimensional model from a plurality of different viewpoints.

6. The computer-implemented method of claim 1, wherein the stretching factor for the fragment is determined based at least in part on a surface normal associated with the fragment.

7. The computer-implemented method of claim 1, wherein determining a stretching factor for the fragment comprises:
    accessing a mathematical model projecting a circular element in a two-dimensional space associated with the view-dependent texture as an ellipse on the polygon mesh, the ellipse having a minor axis and a major axis;
    determining the stretching factor based at least in part on the major axis of the ellipse.

8. The computer-implemented method of claim 7, wherein the mathematical model specifies the minor axis of the ellipse based at least in part on the relationship between a surface normal associated with the fragment and the reference direction, the mathematical model further specifying a direction of the major axis based on the relationship between the minor axis of the ellipse and the surface normal, the mathematical model further specifying a magnitude of the major axis based on the relationship between the reference direction and the surface normal.

9. The computer-implemented method of claim 8, wherein the stretching factor is determined based at least in part on the relationship between the major axis of the ellipse and the viewpoint direction associated with the fragment.

10. The computer implemented method of claim 1, wherein the inverse texture stretch component for the fragment is determined based on the relationship between the reference direction and a surface normal associated with the fragment.

11. The computer-implemented method of claim 10, wherein the view stretch component for the fragment is determined based on the relationship between the viewpoint direction associated with the fragment and the surface normal associated with the fragment.

12. The computer-implemented method of claim 11, wherein the view-dependent texture is selected for rendering at the fragment when $s1 \geq s0 - \alpha$ and a base texture is selected for rendering at the fragment when $s0 \leq s1 - \beta$, where $\alpha$ and $\beta$ are constants, $s0$ is the inverse texture stretch component for the fragment, $s1$ is the view stretch component for the fragment, and the base texture is optimized based on viewing the three-dimensional model from a plurality of different viewpoints.

13. The computer-implemented method of claim 1, wherein the reference viewpoint is a canonical viewpoint.

14. A computing system for render a three-dimensional model of a geographic area, the system comprising:
    a display;
    one or more processors;

one or more computer-readable media, the computer-readable media storing instructions that when executed by the one or more processors cause the processors to perform operations, the operations comprising:

rendering on the display a polygon mesh from a perspective of a virtual camera, the polygon mesh modeling geometry of the geographic area;

identifying a reference direction associated with a view-dependent texture to be rendered in conjunction with the polygon mesh, the view-dependent texture optimized for viewing the three-dimensional model from a reference viewpoint associated with the reference direction;

determining a viewpoint direction associated with a fragment of the polygon mesh, the viewpoint direction extending from the virtual camera towards the fragment;

determining a stretching factor for the fragment based at least in part the viewpoint direction associated with the fragment and the reference direction; and selecting a texture for rendering at the fragment based at least in part on the stretching factor;

wherein the stretching factor has an inverse texture stretch component for the fragment and a view stretch component for the fragment.

15. The computing system of claim 14, wherein the view-dependent texture is selected for rendering at the fragment when the stretching factor is less than a threshold.

16. The computing system of claim 14, wherein a base texture is selected for rendering at the fragment when the stretching factor is greater than the threshold, the base texture optimized for viewing the three-dimensional model from a plurality of different viewpoints.

17. The computing system of claim 14, wherein a blended texture is selected for rendering at the fragment based at least in part on the stretching factor, the blended texture comprising a blend between a base texture and the view-dependent texture, the base texture optimized for viewing the three-dimensional model from a plurality of different viewpoints.

18. A tangible non-transitory computer-readable medium comprising computer-readable instructions that when executed by one or more processors, cause the one or more processors to perform operations, the operations comprising:

rendering on the display a polygon mesh from a perspective of a virtual camera, the polygon mesh modeling geometry of the geographic area;

identifying a reference direction associated with a view-dependent texture to be rendered in conjunction with the polygon mesh, the view-dependent texture optimized for viewing the three-dimensional model from a reference viewpoint associated with the reference direction;

determining a viewpoint direction associated with a fragment of the polygon mesh, the viewpoint direction extending from the virtual camera towards the fragment;

determining a stretching factor for the fragment based at least in part on the viewpoint direction associated with the fragment and the reference direction; and selecting a texture for rendering at the fragment based at least in part on the stretching factor;

wherein the stretching factor has an inverse texture stretch component for the fragment and a view stretch component for the fragment.

19. The tangible non-transitory computer-readable medium of claim 18, wherein the stretching factor for the fragment is determined based at least in part on a surface normal associated with the fragment.

* * * * *